Aug. 1, 1961

M. L. STEVENS 2,994,384

HELICOPTER WITH JET DRIVEN ROTOR

Filed Dec. 9, 1957

INVENTOR
MARTIN L. STEVENS

BY Teller & McCormick

ATTORNEYS

Aug. 1, 1961    M. L. STEVENS    2,994,384
HELICOPTER WITH JET DRIVEN ROTOR
Filed Dec. 9, 1957    3 Sheets-Sheet 2

INVENTOR
MARTIN L. STEVENS
BY Teller & McCormick
ATTORNEYS

Aug. 1, 1961 M. L. STEVENS 2,994,384
HELICOPTER WITH JET DRIVEN ROTOR
Filed Dec. 9, 1957 3 Sheets-Sheet 3

INVENTOR.
MARTIN L. STEVENS

BY Teller & McCormick

ATTORNEYS

United States Patent Office
2,994,384
Patented Aug. 1, 1961

2,994,384
HELICOPTER WITH JET DRIVEN ROTOR
Martin L. Stevens, West Hartford, Conn., assignor to
The Kaman Aircraft Corporation, Bloomfield, Conn., a
corporation of Connecticut
Filed Dec. 9, 1957, Ser. No. 701,458
18 Claims. (Cl. 170—135.4)

The invention relates to a helicopter and, more particularly to a helicopter of the type wherein the rotor is driven by compressed air jets at or near the tips of the blades.

It has been heretofore proposed to provide a helicopter of this type wherein there is an air compressor carried directly by the fuselage and driven by an engine on the fuselage, said compressor being connected by ducts with the rotary blades and with the jet nozzles thereon. A helicopter such as last set forth has long ducts from the compressor to the rotor blades and the ducts include troublesome seals between the non-rotary compressor and the rotary blades.

The general object of the present invention is to provide a helicopter of the stated type wherein the compressor is adjacent the rotor, wherein the housing of the compressor is rotatable in unison with the rotor, and wherein the impeller of the compressor is driven at high speed by power derived from an engine on the fuselage.

A more specific object of the invention is to provide various details of construction and arrangement which facilitate the attainment of the above stated more general object.

Another more specific object of the invention is to provide a helicopter of the stated type which includes a power take-off shaft for auxiliary devices or accessories, which shaft is driven by the rotor independently of the compressor impeller.

Another more specific object of the invention is to provide a power connection from the engine to the impeller drive shaft which eliminates gears.

The drawings show two embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 1:
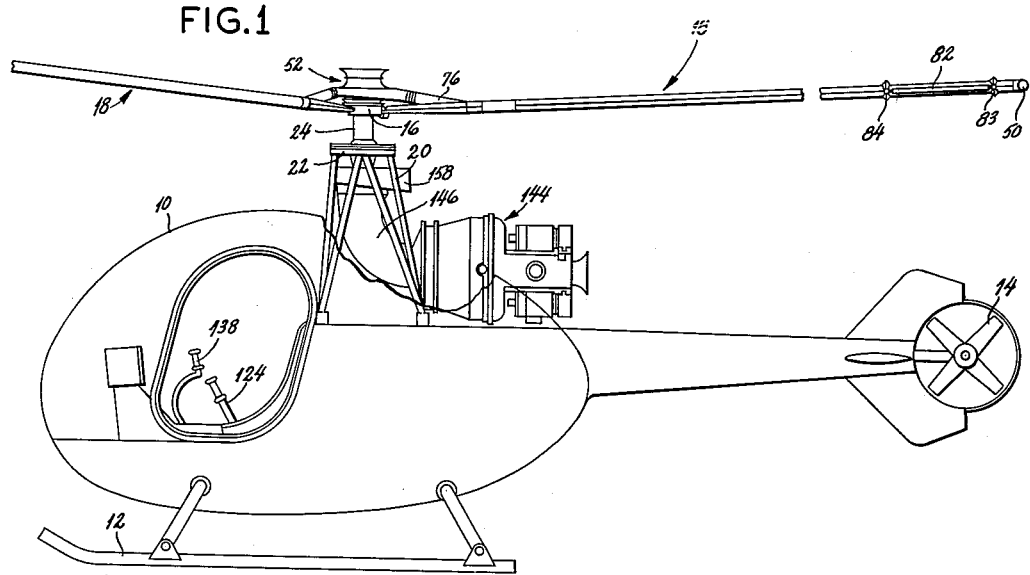
FIG. 1 is a side view of a helicopter embodying the invention, with certain details omitted for simplicity of illustration.

Referring to the drawings, and more particularly FIGS. 1 to 6 thereof, 10 represents the fuselage of a helicopter embodying the invention, 12 represents the landing gear and 14 represents the tail rotor. These parts can be widely varied and they do not of themselves constitute any part of the invention.

The supporting rotor of the helicopter is connected with the fuselage for rotation about a substantially vertical central axis. The rotor includes a rototable hub 16 having a central opening therein concentric with said central axis and said rotor includes a plurality of blades 18, 18 connected with the hub and uniformly spaced about said central vertical axis. Three blades are shown, but the invention is not so limited.

Preferably, an upright pylon 20 is rigidly connected with the fuselage, which pylon includes a horizontal platform 22 having a central opening therein. A vertical hollow support member 24 is preferably mounted on the pylon, and as shown, the support member 24 has a base flange 26. The flange 26 engages a flange 28 secured to the platform 22 and forming a part of an annular bracket 30 which extends downwardly through said central opening in the platform and can be regarded as being a downward extension of the support member 24. When a support member such as 24 is provided, it is so located as to extend through the said central opening in the hub 16. Suitable means as hereinafter described is provided for rotatably connecting said hub 16 with said support member 24 for rotation about an axis approximately coinciding with said central vertical axis.

Preferably, the hub 16 is connected with the support member 24 for universal adjustment of its said axis of rotation. As shown, the support member 24 is provided with an annular rib 32 having a spherically convex surface and there is provided an annular socket member 34 having a spherically concave surface fitting the surface of said rib 32. Said rib 32 and said annular socket member 34 collectively constitute a spherical joint. For assembly, the socket member 34 may have two separable parts, not shown. The hub 16 surrounds the socket member 34 and ball bearings 36, 36 are interposed between them. The annular socket member 34 and the bearings 36, 36 collectively constitute a rotor carrier.

The rotor, comprising the hub 16 and the blades 18, 18, is freely rotatable on the support member 24 and the hub and the socket member are universally adjustable within narrow limits with respect to said rib 32 on said support member 24 so that the axis of rotation is correspondingly adjustable. The described spherical joint gives uninhibited freedom to the rotor within limits and enables said axis of rotation to be always perpendicular to the plane of the tip path of the blades 18, 18.

Preferably, each blade is connnected with the hub for adjustment relatively thereto within narrow limits. As shown, each blade comprises a spar 38 to which the main airfoil section 40 of the blade is rigidly attached. At the inner end of the spar is a ball 42 which fits a socket in the hub 16. The ball 42 is held in the socket by means of two sets of thin flexible metallic tension straps 44, 44 connected at their inner ends to the hub and connected at their outer ends to the spar. These straps 44, 44 prevent outward movement of the blade, and they are sufficiently flexible to permit the blade to move upwardly or downwardly about a transverse horizontal axis through the center of the ball and to permit the blade to adjust pitchwise about a radial axis through the center of the ball. A stop 46 on the spar 38 limits relative downward movement of the blade.

Figure 2:
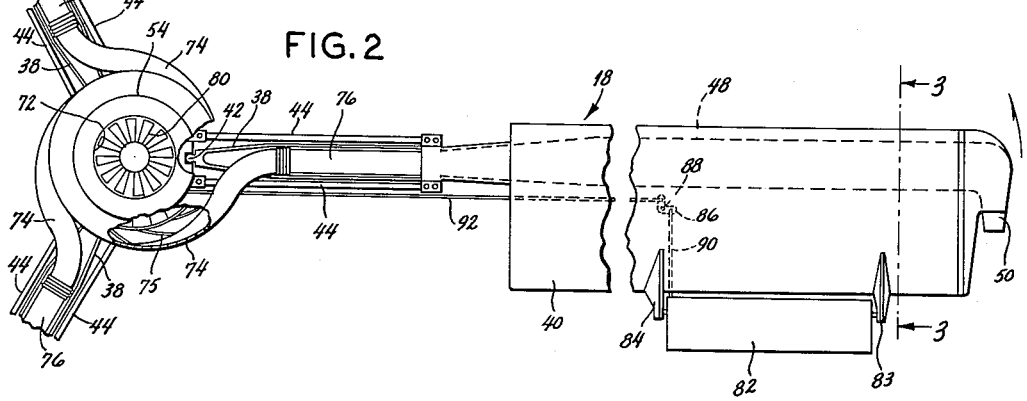
FIG. 2 is an enlarged fragmentary plan view of a portion of the rotor, only one blade being fully shown.
Figure 3:
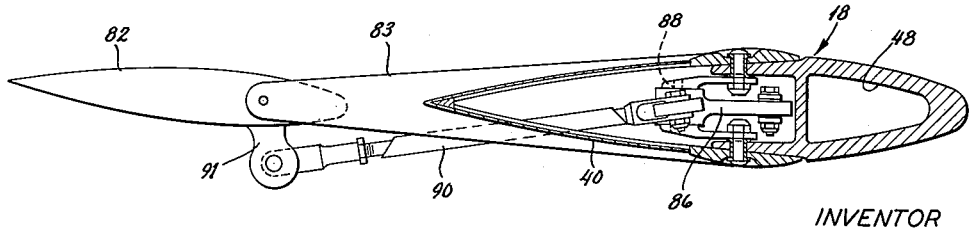
FIG. 3 is a sectional view through one blade, this view being taken along the line 3—3 of FIG. 2.

As best shown in FIGS. 2 and 3, each blade has a radial duct 48 therein adapted to receive air under pressure as hereinafter explained. Preferably, the outer portion of the spar 38 is hollow and this hollow spar provides the required air duct. At the tip of each blade there is provided a jet nozzle 50 connected with said duct 48 and adapted to discharge air tangentially and rearwardly with respect to the direction of blade movement.

For supplying air to the blade ducts and nozzles, an air compressor 52 is provided above the rotor. A centrifugal compressor is preferred and is shown, but the invention is not necessarily so limited. The compressor includes a housing 54 rotatable about said central axis and connected with the rotor as hereinafter explained for rotation in unison therewith, said housing having air intake and discharge openings. When the compressor is of the centrifugal type, it also includes an impeller 56 independently rotatable about said control axis and at a much greater speed. The impeller 56 is connected with and is driven by a high speed vertical central impeller shaft 58, said shaft being driven as hereinafter explained by a suitable power means or engine which is located on the fuselage and is connected with the shaft at the lower end thereof.

A means is provided which includes a bearing separate from and additional to the rotor bearings 36 for connecting the compressor housing 54 with the fuselage for rotation about said central axis. As shown, the compressor housing has a tubular hub 60 surrounding the shaft 58 and located within the support member 24. The hub 60 and the housing 54 are rotatably connected with the support member by means of bearings 62 and 64. The shaft 58 is rotatably supported by an upper bearing 66 engaging the hub 60 and by a lower bearing 68 engaging the bracket 26.

Figure 5:
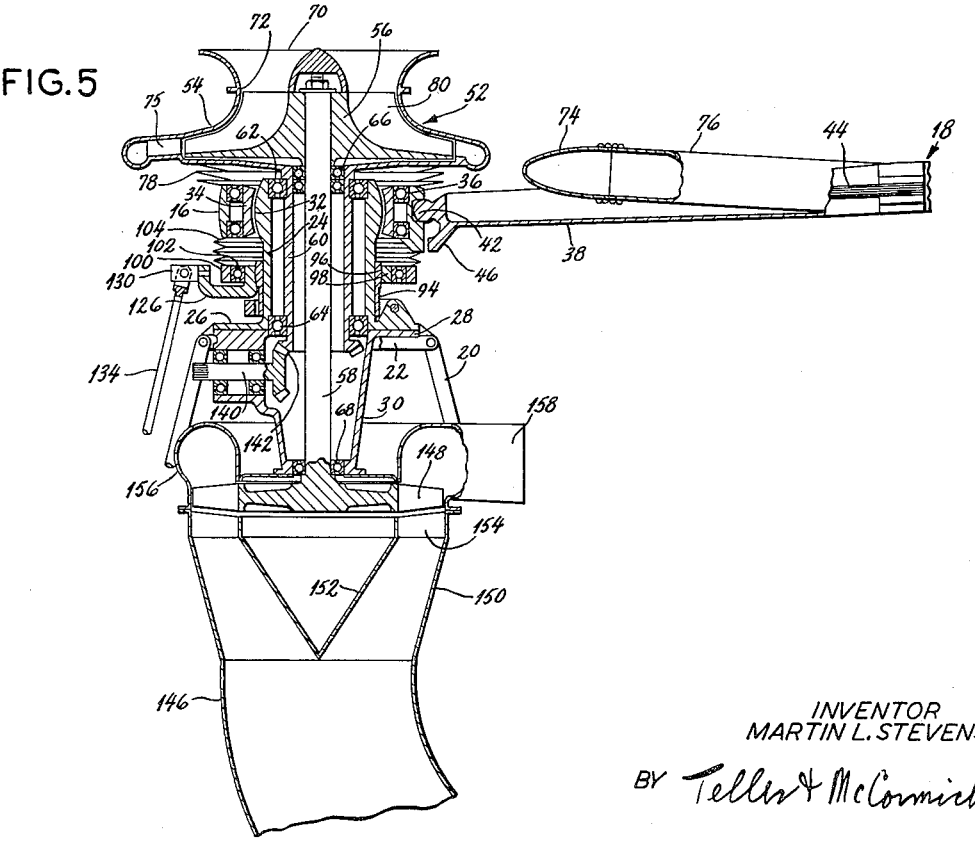
FIG. 5 is a vertical sectional view of the parts shown in FIG. 4.

The rotatable housing 54 has an approximately flat bottom connected with the upper end of the tubular hub 60, and the outer wall of said housing 54 conforms generally to a surface of revolution and a large opening 70 is provided at the top. As shown in FIG. 5, the sides of the outer wall converge downwardly from said opening 70 to a throat at 72 and said sides then sharply diverge downwardly and merge into involute portions 74, 74, there being one of said portions for each rotor blade. Generally radial tubes 76, 76 pneumatically connect the outer ends of said involute portions 74, 74 with the inner ends of the ducts 48, 48 in the blades. The spars 38, 38 are recessed at their upper portions to provide spaces for said tubes 76, 76.

The impeller 56 of the compressor is shown as being a blower wheel located below the housing throat and comprising a central hub secured to the upper portion of the shaft 58 and also comprising an annular series of generally radial blades 80, 80 secured to said central hub. Said blades 80, 80 have their outer edges closely adjacent the diverging housing walls below the throat so that said blades generally conform in outline to the last said walls. Said diverging housing walls and the face of the hub are shaped to provide an annular channel outwardly and downwardly inclined and having converging sides. The blades 80, 80 may be exactly radial or they may be inclined and said blades may be either flat or curved.

The impeller 56 is rotated at high speed and it serves to draw air downwardly through the opening 70 and the throat 72 and to then move the air outwardly with increasing pressure to said involute portions 74, 74. Diffuser vanes 75, 75 surround the impeller within the housing and said vanes serve to convert kinetic energy of the moving air to pressure energy. The before-mentioned flexible tubes 76, 76 connect the housing portions 74, 74 with the blade ducts 48. The air is then conducted by virtue of its own pressure, and with the assistance of centrifugal pumping, through said ducts 48 to said nozzles 50. The air jets discharged by the nozzles 50 provide the propulsive force required to rotate the blades in the selected direction, that is, in the counterclockwise direction as shown in FIG. 2. Thus, the blades are driven by power derived from the power means in the fuselage, but without any direct mechanical drive connection from said power means to said rotor and without any transfer of air under pressure from the fuselage to the rotor.

It has been stated that the housing 54 is connected with the rotor for rotation in unison therewith. Said tubes 76, 76 constitute means for mechanically connecting the housing with the rotor to effect housing rotation. When the blades 18, 18 are flexibly connected with the hub 16 as described and when the axis of hub rotation is subject to adjustment as described, said tubes 76, 76 are flexible to accommodate small movements of the blades relatively to the housing. In order that the tubes 76, 76 may be reasonably free from stress, a supplemental means is preferably provided for also effecting rotation of the housing in unison with the rotor. As shown in FIG. 5, the last said means is flexible bellows-like structure 81 connected at its top with the bottom of the housing 54 and connected at its bottom with the upper face of the hub 16. This last-mentioned structure acts additionally to the tubes 76, 76 to insure rotation of the compressor housing in unison with the rotor, notwithstanding variations in the position of the axis of rotor rotation.

For the control of the helicopter, means are provided for adjusting the pitches of the blades collectively and cyclically. This means is shown as being of the type disclosed in the Kaman and Stevens Patent No. 2,695,674, dated November 30, 1954.

The tension straps 44, 44 for each blade can be regarded as constituting portions of the blade, and the pitch of the blade is changed by twisting the blade particularly at said straps. The main aerofoil section 40 of each blade is provided with a trailing aerofoil flap 82 carried by onboard and inboard brackets 83 and 84 which project rearwardly from said blade section. The flap is adjustable about an axis extending longitudinally of the blade. Said flap 82 when properly adjusted serves during rotor rotation to apply aerodynamic forces which serve to twist the corresponding blade particularly at said straps 44, 44, and to thereby change the blade pitch.

Referring particularly to FIG. 3, it will be seen that when the flap has a negative pitch angle, it tends to move relatively downwardly and to twist the blade counterclockwise about its spanwise axis so as to increase the positive pitch thereof. An increase in the negative pitch of the flap increases the positive pitch of the blade and a decrease in the negative pitch of the flap decreases the positive pitch of the blade.

The means for moving said flap 82 of each blade to enable it to effect said twisting will now be described. Associated with the inboard bracket 84 is a bell crank 86 located within the hollow blade section and movable about a vertical axis at 88. A transverse link 90 connects one arm of the bell crank with a horn 91 depending from the flap 82. A longitudinal push-pull rod 92 is connected with the other arm of the bell crank and extends toward the hub. Outward movement of the rod 92 away from the hub increases the negative flap pitch and increases the positive blade pitch, and inward movement of the rod 92 decreases the negative flap pitch and decreases the positive blade pitch. Changes in blade pitch are resisted by said tension straps 44, 44 and said straps tend to retain the blades to predetermined normal pitches.

Figure 4:
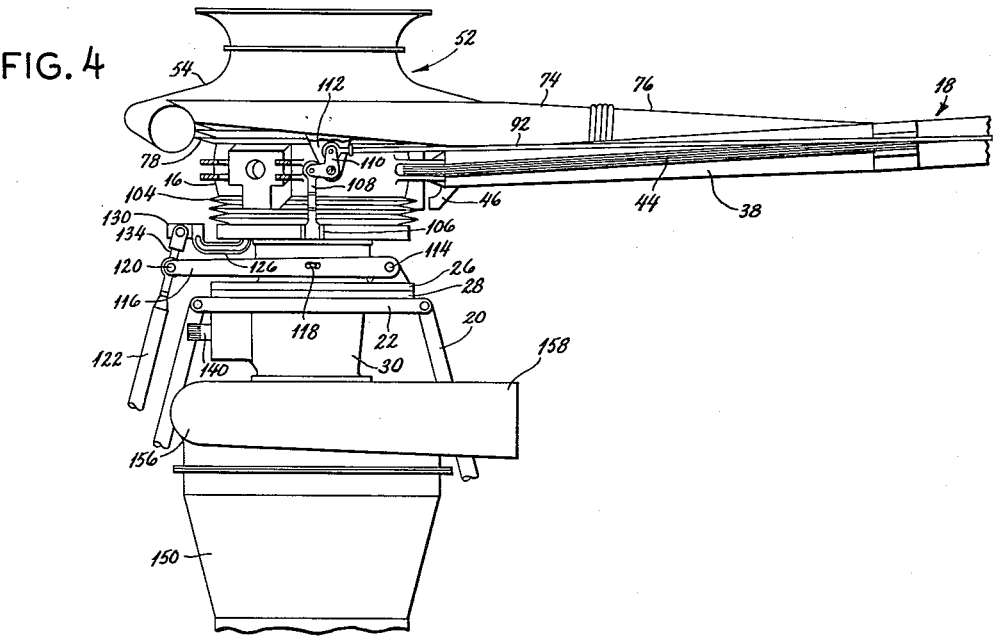
FIG. 4 is an enlarged fragmentary side view of the rotor and associated parts as shown in FIGS. 1 and 2, this view showing only one of the three rotor blades.
Figure 6:
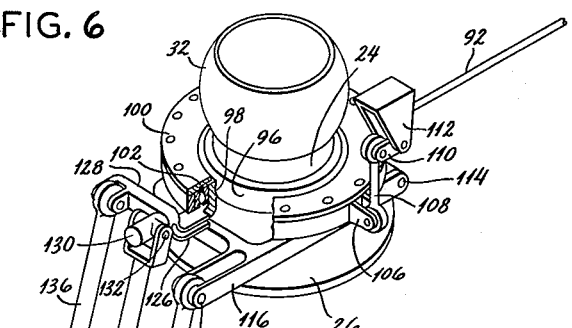
FIG. 6 is a perspective view of some of the hub and pitch control parts as shown in FIGS. 4 and 5.

Referring more particularly to FIGS. 4, 5 and 6, a vertically movable sleeve 94 is provided on the support member 24 and this sleeve is provided with an annular rib 96 having a spherically convex surface. A ring 98 is provided having a spherically concave surface fitting the surface of the rib 96. For assembly, the ring 98 may have two separable parts, not shown. A swash plate 100 is carried by the ring 98, bearings 102 being interposed to permit rotation of the plate 100 relatively to the ring 98. The swash plate 100 and the ring 98 are universally adjustable within narrow limits with respect to the rib 96 and the sleeve 94 so that the axis of rotation of said swash plate or the azimuth axis is correspondingly adjustable. The swash plate is connected with the rotor hub 28 by a bellows-type connector 104 similar to the connector 78. This connector 104 insures rotation of the swash plate 100 in unison with the rotor without interfering with the angular adjustment of either of them.

The rotatable swash plate 100 has lateral projections 106 to which are connected the lower ends of links 108. There is a projection 106 and a link 108 for each blade, but only one projection and one link are shown in the drawings. Each link 108 is connected by a bell crank 110 with a corresponding push-pull rod 92. Each said bell crank 110 is supported by a bracket 112 depending from the bottom of the compressor housing 54.

Pivotally connected at 114 to the flange 22 of the support member 24 is a yoke 116 which embraces the sleeve 94 and has elongated slots which receive trunnions 118 on the sleeve. The yoke 116 is pivotally connected at 120 with a link 122. By means not fully shown, the link 122 is connected with a collective pitch stick 124 operable by the pilot and shown in FIG. 1. By moving the stick 124 forwardly or rearwardly, the pilot can move the yoke 116 upwardly or downwardly to correspondingly move the sleeve 94. As the sleeve 94 moves upwardly or downwardly, the swash plate 100 and the several links 108 are correspondingly moved. As the several links 108 are moved upwardly or downwardly, all of the corresponding push-pull rods 92 are moved outwardly or inwardly in unison. As before stated, outward movement of the rods 92 increases the blade pitches and inward movement decreases the blade pitches. Thus, the pilot by means of the stick 124 can collectively increase or decrease the pitches of the blades.

As has been stated, the rotatable swash plate 100 and the nonrotatable ring 98 are angularly adjustable so that the axis of rotation of said plate may be changed. For effecting adjustment, the ring 98 is provided with a forward projection 126 having a lateral extending arm 128. Extending forwardly from the projection 128 is a trunnion 130 carrying a universal joint connection 132. Pivotally connected with said connection 132 is a link 134. By means of the link 134, the ring 98 may be moved about a transverse axis so as to tilt the azimuth axis forwardly or rearwardly. Pivotally connected with said laterally extending arm 128 is a link 136. By means of the link 136, the ring 98 may be moved about a longitudinal axis at the center of the trunnion 130 so as to tilt the azimuth axis laterally in either direction.

By means not fully shown, the links 134 and 136 are connected with a cyclic pitch stick 138 operable by the operator and shown in FIG. 1. By moving the stick 138 forwardly or rearwardly, the pilot can move link 134 to tilt the azimuth axis forwardly or rearwardly, and by moving the stick 138 laterally in either direction, the pilot can move the link 136 to tilt the azimuth axis laterally in the corresponding direction. When the azimuth axis is tilted, said swash plate moves in an inclined plane and the several links 108 are moved upwardly and downwardly to cyclically change the pitches of the blades. By combining longitudinal and lateral movements of the stick 138, the pilot can tilt the azimuth axis in any direction and to any extent within fixed limits and, thus, the pilot can cyclically change the pitches of the blades for directional control of the helicopter.

By means of the two sticks 124 and 138, hereinafter called control members, the pilot can effect any desired changes in blade pitches and can thus fully control the helicopter.

In the event of power failure or in the event that the power means or engine is operated at only a minimum speed, the shaft 58 and the impeller 56 of the compressor may be stationary or rotating only slowly with the result that the compressor does not supply air under sufficient pressure to maintain rotor rotation. In such event, the rotor rotates automatically in the same direction as the result of aerodynamic forces and the descent of the helicopter is resultantly controlled.

A shaft 140 is preferably provided for supplying power to various auxiliary devices or accessories, not shown. Said shaft 140 is hereinafter referred to as a power take-off shaft. Said shaft is rotatable independently of the impeller shaft 58 and it is shown as being horizontal and as being mounted by means of suitable bearings in the bracket 30. A connection is provided for transmitting power from the rotor and the impeller housing to said shaft 140 so that the shaft is always rotated during rotation of the rotor. As shown, the shaft 140 is connected by gearing 142 with the tubular hub 60 of the compressor housing. Inasmuch as the power take-off shaft 140 is driven by the compressor housing and the rotor and only indirectly by the main power shaft 58, said take-off shaft is always rotated at a speed within a normal range whenever the helicopter is operating, whether in a power-on regime or in an autorotative regime. Otherwise stated, the take-off shaft is normally rotated even when the shaft 58 is stationary or rotating only slowly.

The drive shaft 58 may be variously connected with the power means on the fuselage. As shown in FIGS. 1, 4 and 5, a gas generator engine 144 is provided on the fuselage which engine is or may be of known construction and does not of itself constitute a part of the invention. The engine 144 is connected by a forwardly and upwardly curved duct 146 with a turbine wheel 148 secured to the lower end of said drive shaft 58. Interposed between the duct 146 and the wheel 148 is an annular duct 150 having a central conical section 152. At the upper portion of the duct 150 and surrounding the conical section 152 is an annular series of stator guide vanes 154 which vanes are immediately below the vanes of the turbine wheel. Said turbine wheel 148 is in the lower portion of a stationary housing 156 preferably having a partially involute shape and terminating at a discharge duct 158.

High energy gas from the gas generator 144 passes through the ducts 146 and 150 and is admitted to the turbine wheel 148 through the stator vanes 154. After expending most of its energy at said turbine wheel 148, the gas enters the housing 156 and is discharged to the ambient atmosphere through the duct 158. The energy imparted by the gas to the turbine wheel serves to drive the impeller shaft 58 and the impeller 56 as previously described. The conical duct section 152 supports the inner ends of the guide vanes 154 and serves also to shield the central portion of the turbine wheel from the hot gases.

The provision of a turbine wheel such as 148 for driving the drive shaft has the advantage that it makes it possible for said drive shaft to be considerably shorter than would otherwise be necessary and, in view of the necessary very high speed of the shaft, the reduced length is an important factor. Furthermore, the provision of the turbine wheel for driving the drive shaft avoids the necessity for providing gears for driving said shaft.

Figure 7:
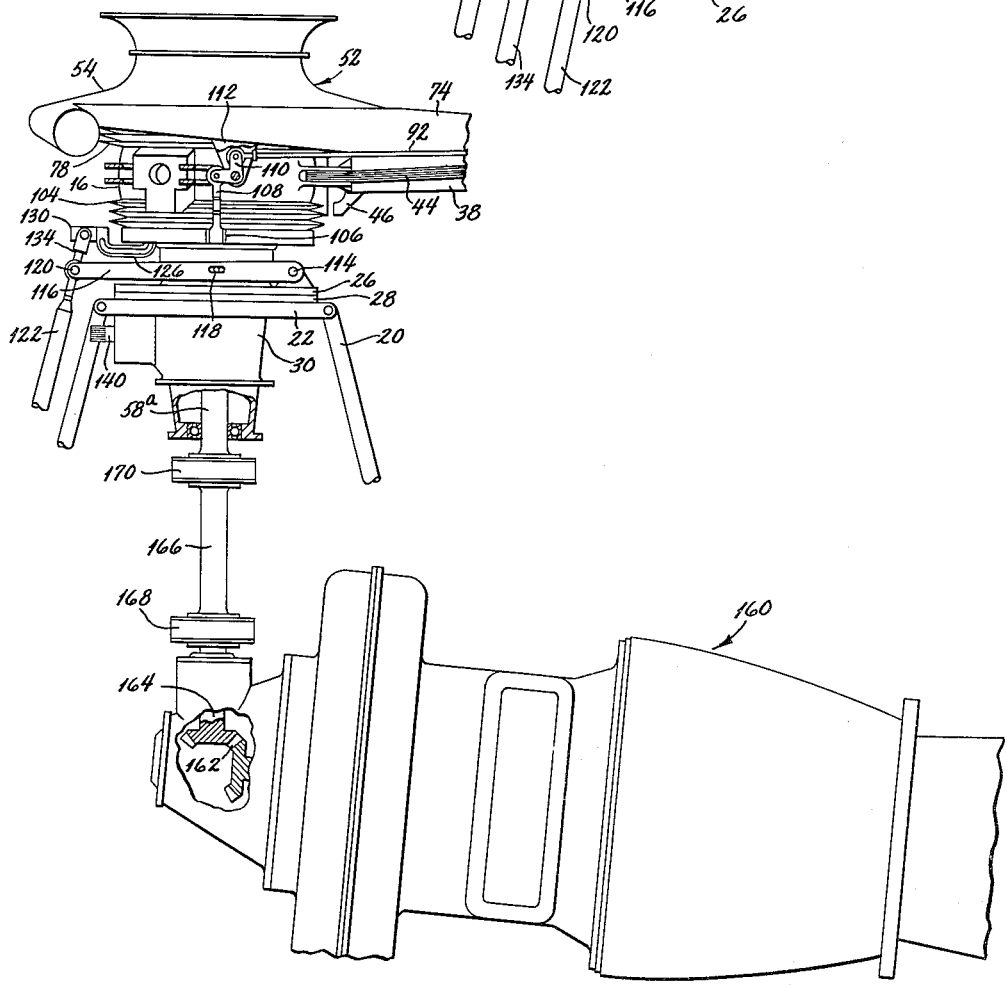
FIG. 7 is a view generally similar to FIG. 4 but showing an alternative mechanism.

While it is ordinarily preferred to provide a turbine drive for the drive shaft as shown in FIGS. 4 and 5, such a tubine drive is not always necessary. As shown in FIG. 7, an impeller drive shaft 58ª is provided which is generally similar to the shaft 58, but somewhat longer. A suitable engine is provided on the fuselage and a gas turbine 160 is shown, but the invention is not so limited. The turbine 160 is or may be of known construction and does not of itself constitute a part of the invention. The engine has an output shaft at an angle to the impeller drive shaft 58ª. Connected with said output shaft of the turbine 160 by means of gearing 162 is a vertical drive shaft 164 which is below the drive shaft 58ª and aligns with it. Interposed between the shafts 164 and 58ª is a vertical connector shaft 166. Said shaft is connected by flexible couplings 168 and 170 with said shafts 164 and 58ª.

The invention claimed is:

1. The combination in a helicopter, of a fuselage, a support member fixedly connected with the fuselage, a supporting rotor connected with the support member for rotation about a substantially vertical central axis, said rotor including a hub having a central opening and also including a plurality of similar blades connected with said hub and uniformly spaced circumaxially each of which blades has a radial air duct therein and has a jet nozzle connected to receive air from the duct and to discharge said air tangentially, a vertical drive shaft extending through said central opening in the hub and mounted for rotation independently of the rotor about said central axis, an air compressor adjacent said rotor and including a housing rotatable about said central axis in unison with the rotor which housing has an air intake and has a plurality of discharge openings corresponding to said plurality of rotor blades, said compressor also including an impeller located within said housing and free for rotation entirely independently of said rotor which impeller is connected with said independently rotatable drive shaft to be driven thereby, means separate from the rotor for rotatably supporting the compressor housing on the support member, a plurality of generally radial tubes pneumatically connecting the housing discharge openings with the respective air ducts in the several rotor blades, and power means on the fuselage connected with said vertical drive shaft for driving it and said impeller independently of said rotor and housing at a speed greatly in excess of the speed of said rotor and housing so as to draw air through said housing intake opening and so as to discharge air through said housing discharge openings and thus supply air under pressure to said blade ducts to said jet nozzles.

2. The combination in a helicopter, of a fuselage, a support member fixedly connected with the fuselage, a supporting rotor connected with the support member for rotation about a substantially vertical central axis, said rotor including a hub having a central opening and also including a plurality of similar blades connected with said hub and uniformly spaced circumaxially each of which blades has a radial air duct therein and has a jet nozzle connected to receive air from the duct and to discharge said air tangentially, a vertical drive shaft extending through said central opening in the hub and mounted for rotation independently of the rotor about said central axis, an air compressor above said rotor and including a housing separate from said rotor and rotatable about said central axis which housing has air intake and has a plurality of discharge openings corresponding to said plurality of rotor blades, said compressor also including an impeller located within said housing and free for rotation entirely independently of said rotor which impeller is connected with said independently rotatable drive shaft to be driven thereby, means separate from the rotor for rotatably supporting the compressor housing on the support member, a plurality of generally radial tubes mechanically connecting said compressor housing with said rotor for rotation in unison therewith and pneumatically connecting the housing discharge openings with the respective air ducts in the several rotor blades, and power means on the fuselage connected with said vertical drive shaft for driving it and said impeller independently of said rotor and housing at a speed greatly in excess of said speed of the rotor and housing so as to draw air through said housing intake opening and so as to discharge air through said housing discharge openings and thus supply air under pressure to said blade ducts and to said jet nozzles.

3. The combination in a helicopter, of a fuselage, a supporting rotor including a hub having a central opening and also including a plurality of similar blades connected with said hub and uniformly spaced about a central vertical axis each of which blades has a radial air duct therein and has a jet nozzle connected to receive air from the duct and to discharge said air tangentially, means including a bearing for connecting the rotor with the fuselage for rotation about an axis approximately coinciding with said central axis, a vertical drive shaft extending through said central opening in the hub and mounted for rotation independently of the rotor about said central axis, a centrally located air compressor above said rotor and including a housing separate from said rotor and rotatable about said central axis which housing has air intake and has a plurality of discharge openings corresponding to said plurality of rotor blades, said compressor also including an impeller located within said housing and free for rotation entirely independently of said rotor, which impeller is connected with said independently rotatable drive shaft to be driven thereby, means including a bearing separate from and additional to said rotor bearing for connecting the compressor housing with the fuselage for rotation about said central axis, a plurality of generally radial tubes mechanically connecting said compressor housing with said rotor for rotation in unison therewith and pneumatically connecting the housing discharge openings with the respective air ducts in the several rotor blades, and power means on the fuselage connected with said vertical drive shaft for driving it and said impeller independently of said rotor and housing at a speed greatly in excess of the speed of said rotor and housing so as to draw air through said housing intake opening and so as to discharge air through said housing discharge openings and thus supply air under pressure to said blade ducts and to said jet nozzles.

4. The combination in a helicopter, of a fuselage, a supporting rotor including a hub having a central opening and also including a plurality of similar blades connected with said hub and uniformly spaced about a central vertical axis each of which blades has a radial air duct therein and has a jet nozzle connected to receive air from the duct and to discharge said air tangentially, a rotor carrier including a bearing for connecting the rotor with the fuselage for rotation about said central axis, means for connecting said rotor carrier with said fuselage for angular adjustment so that said axis of rotor rotation may be tilted, a vertical drive shaft extending through said central opening in the hub and mounted for rotation independently of the rotor about said central axis, an air compressor above said rotor and including a housing separate from said rotor and rotatable about said central axis which housing has air intake and discharge openings, said compressor also including an impeller located in said housing and connected with said independently rotatable drive shaft to be driven thereby, means including a bearing separate from and additional to the rotor bearing for connecting the compressor housing with the fuselage for rotation about said central axis, a plurality of generally radial flexible tubes mechanically connecting said compressor housing with said rotor for rotation in unison therewith and pneumatically connecting the housing discharge openings with the respective air ducts in the several rotor blades, and power means on the fuselage connected with said vertical drive shaft for driving it and said impeller at a speed greatly in excess of the speed of the rotor and housing so as to draw air through said housing intake opening and discharge air through said housing discharge openings and thus supply air under pressure to said blade ducts and to said jet nozzles.

5. The combination as set forth in claim 4 wherein a means is provided which is additional to said tubes and which serves to connect said compressor housing with said rotor hub for rotation in unison therewith.

6. The combination in a helicopter, of a fuselage, a vertical hollow support member fixedly connected with the fuselage, a rotor including a hub surrounding said support member and also including a plurality of similar blades connected with said hub and uniformly spaced circumaxially each of which blades has a radial air duct therein and has a jet nozzle connected to receive air from the duct and to discharge said air tangentially, a rotor carrier including a bearing for connecting the rotor hub with the support member so as to permit rotation about an approximately vertical axis and so as to prevent relative vertical movement, means for connecting said carrier with said support member for angular adjustment so that said axis of rotor rotation may be tilted, a vertical coaxial drive shaft located within said support member and mounted for rotation independently of the rotor, power means on the fuselage connected with said shaft for driving it, an air compressor on said support member above said rotor carrier which compressor includes a housing entirely separate from said rotor but connected for rotation in unison therewith, said compressor also including an impeller in said housing and free for rotation entirely independently of said rotor which impeller is connected to be independently driven by said rotatable drive shaft at a speed greatly in excess of the speed of said rotor, and a plurality of generally radial flexible tubes respectively connecting said compressor housing with the air ducts in the several rotor blades and serving to supply air under pressure to said blade ducts and to said jet nozzles.

7. The combination in a helicopter, of a fuselage, a vertical hollow support member fixedly connected with the fuselage, a rotor including a hub surrounding said support member and also including a plurality of similar blades connected with said hub and uniformly spaced circumaxially each of which blades has a radial air duct therein and has a jet nozzle connected to receive air from the duct and to discharge said air tangentially, a rotor carrier including a bearing for connecting the rotor hub with the support member so as to permit rotation about an approximately vertical axis and so as to prevent relative vertical movement, a vertical coaxial drive shaft located within said support member and mounted for rotation independently of the rotor, power means on the fuselage connected with said shaft for driving it, an air compressor on said support member above said rotor carrier which compressor includes a housing entirely separate from said rotor but connected for rotation in unison therewith, said compressor also including an air impeller in said housing and free for rotation entirely independently of said rotor which impeller is connected to be independently driven by said rotatable drive shaft at a speed greatly in excess of the speed of said rotor, said compressor housing having an approximately flat bottom and conforming generally to a surface of revolution with a large central opening at the top and with the sides converging downwardly to a throat and diverging downwardly from said throat and said compressor impeller being below said housing throat and having a central hub and a series of radiating blades generally conforming in outline to said diverging housing side walls and said compressor further including a series of diffuser blades within the housing and surrounding the impeller, and a plurality of generally radial tubes connected at their inner ends with the compressor housing near the periphery thereof and respectively connected at their outer ends with the air ducts in the several rotor blades, said tubes serving to supply air under pressure to said blade ducts and to said jet nozzles.

8. The combination in a helicopter, of a fuselage, a vertical hollow support member rigidly connected with the fuselage, a rotor including a hub surrounding said support member and also including a plurality of similar blades connected with said hub and uniformly spaced circumaxially each of which blades has a radial air duct therein and has a jet nozzle connected to receive air from the duct and to discharge said air tangentially, a rotor carrier including a bearing for connecting the rotor hub with the support member so as to permit rotation about an approximately vertical axis and so as to prevent relative vertical movement, a vertical coaxial drive shaft located within said support member and mounted for rotation independently of the rotor, power means on the fuselage connected with said shaft for driving it, an air compressor on said support member above said rotor carrier which compressor includes a housing connected with said rotor for rotation in unison therewith and which compressor also includes an impeller in said housing directly connected with said rotatable drive shaft, a plurality of generally radial tubes respectively connecting said compressor housing with the air ducts in the several rotor blades and serving to supply air under pressure to said blade ducts and to said jet nozzles, a depending hub on said housing extending within said hollow support member and surrounding said impeller shaft, bearings interposed between said support member and the exterior of said housing hub, and another bearing interposed between said impeller shaft and the interior of said housing hub.

9. The combination as set forth in claim 8 wherein said support member is provided with an extension rigid therewith and extending downwardly beyond the housing hub, and a bearing interposed between said impeller shaft and said housing extension.

10. The combination in a helicopter, of a fuselage, a supporting rotor connected with the fuselage for rotation about a substantially vertical central axis, said rotor including a hub having a central opening and also including a plurality of similar blades connected with said hub and uniformly spaced circumaxially each of which blades has a radial air duct therein and has a jet nozzle connected to receive air from the duct and to discharge said air tangentially, a vertical drive shaft extending through said central opening in the hub and mounted for rotation independently of the rotor about said central axis, an air compressor supported entirely separately from said rotor and including a housing rotatable about said central axis in unison with the rotor which housing has an air intake and discharge opening, said compressor also including an impeller within said housing and free for rotation entirely independently of said rotor which impeller is connected with said independently rotatable drive shaft to be driven thereby, a plurality of generally radial tubes pneumatically connecting the housing discharge openings with the respective air ducts in the several rotor blades, power means on the fuselage connected with said vertical drive shaft for driving it and said impeller at a speed greatly in excess of the speed of the rotor and housing so as to draw air through said housing intake opening and discharge air through said housing discharge openings and thus supply air under pressure to said blade ducts and to said jet nozzles, a power take-off shaft rotatable independently of said impeller shaft, and means connected with said rotor and said compressor housing for transmitting power from said rotor and housing to said power take-off shaft.

11. The combination as set forth in claim 10 wherein the compressor housing has a depending hub extending within said hollow support member and surrounding said impeller shaft, wherein a bracket is provided below the support, wherein said power take-off shaft is rotatably mounted in said bracket, and wherein gearing is provided for transmitting power from the housing hub to said take-off shaft.

12. The combination in a helicopter, of a fuselage, a pylon on the fuselage, a vertical hollow support member attached to the pylon, a hollow bracket on the pylon below the support member, a rotor including a hub surrounding said support member and also including a plurality of similar blades connected with said hub and uniformly spaced circumaxially each of which blades has a radial air duct therein and has a jet nozzle connected to receive air from the duct and to discharge said air tangentially, a rotor carrier including a bearing for connecting the rotor hub with the support member so as to permit rotation about an approximately vertical axis and so as to prevent relative vertical movement, a vertical coaxial drive shaft located within said support member and within said bracket and mounted for rotation independently of the rotor, power means on the fuselage connected with said shaft for driving it, an air compressor on said support member above said rotor carrier which compressor includes a housing connected with said rotor for rotation in unison therewith and which compressor also includes an impeller in said housing directly connected with said rotatable drive shaft, a plurality of generally radial tubes respectively connecting said compressor housing with the air ducts in the several rotor blades and serving to supply air under pressure to said blade ducts and to said jet nozzles, a depending hub on said compressor housing extending within said hollow support member and surrounding said impeller shaft, vertically spaced bearings interposed between said support member and the exterior of said housing hub, upper and lower bearings interposed respectively between the upper portion of said impeller shaft and the interior of said housing hub and between the lower portion of said impeller shaft and the interior of said housing hub, a power take-off shaft rotatably mounted in said bracket below the bottom of said housing hub and above said lower bearing, and gearing connecting said housing hub with said take-off shaft for driving the latter.

13. The combination in a helicopter, of a fuselage, a vertical hollow support member fixedly connected with the fuselage, a rotor including a hub surrounding said support member and also including a plurality of similar blades connected with said hub and uniformly spaced circumaxially each of which blades has a radial air duct therein and has a jet nozzle connected to receive air from the duct and to discharge said air tangentially, an annular rib on said support member having a spherically convex surface, a rotor carrier comprising an annular socket member having a spherically concave surface fitting the convex surface of said rib and also comprising a bearing interposed between said socket member and said rotor hub, said rotor carrier serving to prevent relative vertical movement of the rotor and said carrier being freely adjustable to enable the axis of rotation of the rotor to be always perpendicular to the tip path of the blades, a vertical coaxial drive shaft located within said support member and mounted for rotation independently of the rotor, power means on the fuselage connected with said shaft for driving it, an air compressor on said support member above said rotor carrier which compressor includes a housing connected with said rotor for rotation in unison therewith and which compressor also includes an impeller in said housing and independently driven by said rotatable drive shaft, and a plurality of generally radial tubes respectively connecting said compressor housing with the air ducts in the several rotor blades and serving to supply air under pressure to said blade ducts and to said jet nozzles.

14. The combination as set forth in claim 13, wherein a flexible connector is interposed between the rotor hub and the compressor housing to constitute means additional to said tubes for causing said housing to rotate in unison with said rotor.

15. The combination in a helicopter, of a fuselage, a vertical hollow support member fixedly connected with the fuselage, a rotor including a hub surrounding said support member and also including a plurality of similar blades connected with said hub and uniformly spaced circumaxially each of which blades has a radial air duct therein and has a jet nozzle connected to receive air from the duct and to discharge said air tangentially, a rotor carrier including a bearing for connecting the rotor hub with the support member so as to permit rotation about an approximately vertical axis and so as to prevent relative vertical movement, a vertical coaxial drive shaft located within said support member and mounted for rotation independently of the rotor, power means on the fuselage connected with said shaft for driving it, an air compressor on said support member above said rotor carrier which compressor includes a housing entirely separate from said rotor but connected for rotation in unison therewith, said compressor also including an impeller in said housing and free for rotation entirely independently of said rotor which impeller is connected to be independently driven by said rotatable drive shaft at a speed greatly in excess of the speed of said rotor, a plurality of generally radial flexible tubes respectively connecting said compressor housing with the air ducts in the several rotor blades and serving to supply air under pressure to said blade ducts and to said jet nozzles, and means for collectively and cyclically changing the pitches of the blades of said rotor during rotor rotation, said means comprising relatively movable pitch control members on the fuselage and also comprising parts supported on and guided by said support member below said rotor carrier.

16. The combination in a helicopter, of a fuselage, a supporting rotor connected with the fuselage for rotation about a substantially vertical central axis, said rotor including a hub having a central opening and also including a plurality of similar blades connected with said hub and uniformly spaced circumaxially each of which blades has a radial air duct therein and has a jet nozzle connected to receive air from the duct and to discharge said air tangentially, a vertical drive shaft extending through said central opening in the hub and mounted for rotation independently of the rotor about said central axis, an air compressor supported entirely separately from said rotor and including a housing rotatable about said central axis in unison with the rotor which housing is separated from the rotor and has an air intake and discharge opening, said compressor also including an impeller located within said housing and free for rotation entirely independently of said rotor which impeller is connected with said independently rotatable drive shaft to be driven thereby, a plurality of generally radial tubes pneumatically connecting the housing discharge openings with the respective airducts in the several rotor blades, a gas turbine wheel connected with the drive shaft below said support member, a gas generator on the fuselage, and means for guiding gas under pressure from said generator to said turbine wheel to enable said turbine wheel to rotate said drive shaft.

17. The combination in a helicopter, of a fuselage, a vertical hollow support member fixedly connected with the fuselage, a rotor including a hub surrounding said support member and also including a plurality of similar blades connected with said hub and uniformly spaced circumaxially each of which blades has a radial air duct therein and has a jet nozzle connected to receive air from the duct and to discharge said air tangentially, a rotor carrier including a bearing for connecting the rotor hub with the support member so as to permit rotation about an approximately vertical axis and so as to prevent relative vertical movement, a vertical coaxial drive shaft located within said support member and mounted for rotation independently of the rotor, an air compressor on said support member above said rotor carrier which compressor includes a housing separate from said rotor hub connected thereto for rotation in unison therewith and which compressor also includes an impeller within said housing and free for rotation entirely independently of said rotor which impeller is independently driven by said rotatable drive shaft, a plurality of generally radial tubes respectively connecting said compressor housing with the air ducts in the several rotor blades and serving to supply air under pressure to said blade ducts and to said jet nozzles, a gas turbine wheel connected with the drive shaft below said support member, a gas generator on the fuselage, and means for guiding gas under pressure from said generator to said turbine wheel to enable said turbine wheel to rotate said drive shaft.

18. The combination in a helicopter, of a fuselage, a supporting rotor connected with the fuselage for rotation about a substantially vertical central axis, said rotor including a hub having a central opening and also including a plurality of similar blades connected with said hub and uniformly spaced circumaxially each of which blades has a radial air duct therein and has a jet nozzle connected to receive air from the duct and to discharge said air tangentially, a vertical drive shaft extending through said central opening in the hub and mounted for rotation independently of the rotor about said central axis, an air compressor supported entirely separately from said rotor and including a housing rotatable about said central axis in unison with the rotor which housing has an air intake has a plurality of discharge openings corresponding to said plurality of rotor blades, said compressor also including an impeller located within said housing and free for rotation entirely independently of said rotor which impeller is connected with said independently rotatable drive shaft to be driven thereby, a plurality of generally radial tubes pneumatically connecting the housing discharge openings with the respective air ducts in the several rotor blades, an engine on the fuselage having an output shaft at an angle to said vertical drive shaft for the impeller, and means including gearing for connecting said engine output shaft with said impeller drive shaft for driving said impeller independently of said rotor and housing at a speed greatly in excess of the speed of said rotor and housing.

References Cited in the file of this patent

UNITED STATES PATENTS

| | | |
|---|---|---|
| Re. 23,448 | Pullin | Dec. 25, 1951 |
| 2,650,666 | Dorand et al. | Sept. 1, 1953 |
| 2,689,615 | Fletcher | Sept. 21, 1954 |
| 2,814,349 | Berry | Nov. 26, 1957 |
| 2,818,223 | Doblhoff | Dec. 31, 1957 |

FOREIGN PATENTS

| | | |
|---|---|---|
| 412,487 | Great Britain | June 28, 1934 |
| 632,065 | Great Britain | Nov. 15, 1949 |
| 756,050 | Great Britain | Aug. 29, 1956 |